Patented June 10, 1930

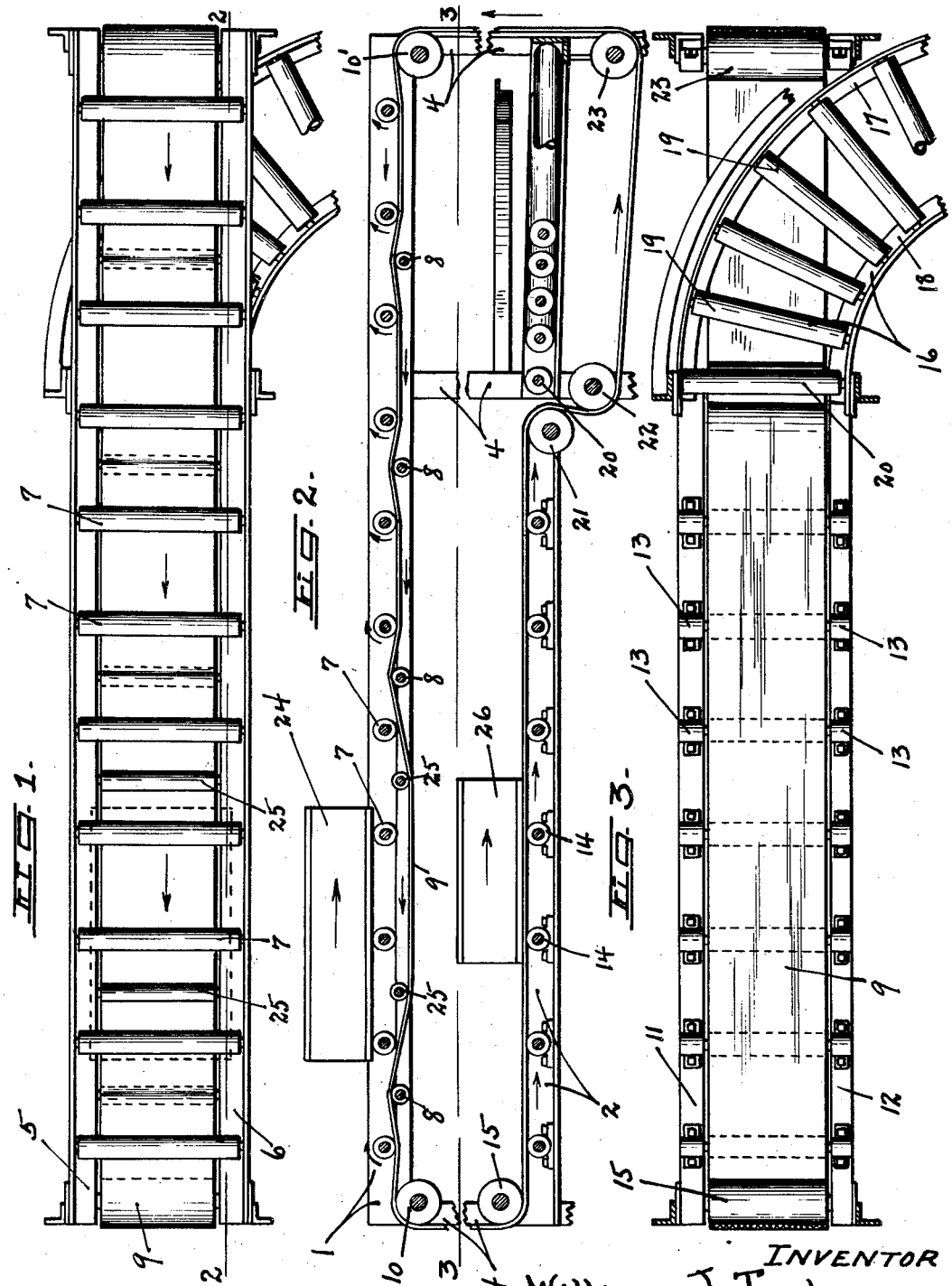

1,763,073

UNITED STATES PATENT OFFICE

WILLIAM J. TAYLOR, OF WINTHROP HARBOR, ILLINOIS, ASSIGNOR TO THE LAMSON COMPANY, OF SYRACUSE, NEW YORK, A CORPORATION OF MASSACHUSETTS

AUTOMATIC CONVEYING SYSTEM FOR MERCHANDISE

Application filed February 6, 1928. Serial No. 252,387.

This invention relates to a new and improved automatic conveying system for merchandise.

Where automatic conveyors are installed in factories or warehouses or similar structures it is often desirable to have a plurality of conveyors which will transport merchandise in the same direction. Conveyors of this type usually consist of moving belts upon which the merchandise is placed for transportation and where it is desired to have a plurality of conveyors carrying merchandise in the same direction it has always been necessary to have individual belts for each of the conveyors. This type of installation increases very materially the original cost of installation and the continuing cost of operation.

It is also desirable in installations of this character to have certain points on the conveyors where the merchandise will automatically come to rest and remain stationary until started forward manually or removed from the conveyor.

The main object of my invention is to provide a conveying system in which a plurality of conveyors will transport merchandise in the same direction and will be motivated by means of a single moving belt.

Another object is to provide a means whereby the merchandise will cease its forward movement at selected points on a conveyor.

Other objects and advantages relate to the size, shape, and arrangement of parts all as will more fully appear from the following description taken in connection with the accompanying drawings in which:—

Figure 1 is a top plan view of a portion of a conveying system in which my device is installed.

Figure 2 is a section on line 2—2 of Figure 1 showing merchandise conveying boxes in position on the conveyor.

Figure 3 is a section on line 3—3 of Figure 2.

It will be understood that the size, shape and relation of parts of an automatic conveying system may be varied at will, but for the purpose of describing the design and function of my device I have here illustrated an automatic conveyor consisting of an upper section —1— and a lower section —2— held in spaced relation by uprights —4— which uprights, in turn, extend downwardly to support the conveyor on the floor (not shown). The upper portion —1— of my structure consists of two side members —5— and —6— secured to uprights 4—4 by riveting or other convenient means and a series of rollers 7—7, in this case shown as eleven. These rollers 7—7 have their opposite ends journaled in side members —5— and —6— for rotary movement and are preferably positioned in spaced relation throughout the length of section —1—. A series of supporting rollers 8—8, in this case shown as four, also have their opposite ends journaled in side members —5— and —6— for rotary movement with their axes slightly lower than the axes of rollers 7—7 and so positioned that when a belt —9— is placed on top of supporting rollers 8—8 and underneath rollers 7—7, the belt —9— will be held in frictional contact with rollers 7—7 so that the movement of belt —9— will cause the rotation of rollers 7—7. Idler rolls 10 and 10', preferably of a larger diameter than rollers 8—8, are journaled in section 1—1 at the opposite ends thereof for the purpose of supporting belt —9— as it moves towards and from bottom section —2—.

Bottom section —2— consists of side members —11— and —12— secured to uprights 4—4 by rivets or other convenient means. Side members —11— and —12— have secured on their upper surfaces, in spaced relation, a plurality, in this case seven, of journal boxes 13—13 by bolts or other convenient means. A series of belt supporting rollers 14—14 are journaled in journal boxes 13—13 for rotary movement. As one end of section —2— is journaled an idler roll —15— which is positioned on the same vertical line as the axis of belt idler rolls —10— and preferably of the same size, and is also so positioned with reference to the axes of rollers —14— that the belt —9— will move from the under surface of idler roll —15— in a horizontal line to the top surfaces of rollers 14—14.

For the purpose of illustrating a means whereby the merchandise being carried on the belt —9— along the bottom section —2— may be removed from the conveyor, I have shown part of a curved section of the gravity conveyor —16— which consists of side bars —17— and —18— into which are journaled a plurality of rollers —19— with the upper surface of the initial roller —20— positioned on a plane with the upper surface of belt —9—.

In order to permit belt —9— to pass beyond gravity section —16— and return to upper section —1— I provide an idler roll —21— journaled in bottom section —2— with its upper surface in the same plane as the upper surfaces of rollers —14— and a second idler roll —22— journaled in one pair of uprights —4— beneath gravity section —16— and I further provide another idler roll —23— journaled below gravity section —16— in the pair of uprights —4— which are at the end of section —2—. The axis of idler roll —23— is in the same vertical plane as the axis of idler roll —10'—.

For the purpose of providing a place where an article being conveyed, for example a box —24—, may cease moving along the top section —1— of the conveyor, I provide idler rolls —25— journaled in side members —5— and —6— of upper section —1— with their axes in the same horizontal plane as the axes of belt supporting rollers 8—8 and positioned approximately half way between a pair of rollers 7—7. The distance between idler rolls 25—25 is sufficiently great so that a plurality, in this case shown as two, rollers 7—7 will be positioned between idler rolls 25—25. It will be understood that the distance between idler rolls 25—25 may be varied at will so that any desired number of rollers 7—7 may be positioned between them.

In the installation of my conveyor, belt —9— is positioned between belt supporting rollers 8—8 and rollers 7—7 and underneath idler rolls —25—. Belt —9— then passes around idler rolls —10— and —15— on to the upper surfaces of rollers 14—14 and idler roll —21—. It then passes around the under surfaces of idler rolls —22— and —23— and returns upward to the upper surface of idler roll —10'—.

No means is shown for imparting movement to belt —9— but it will be understood that any ordinary means may be provided for imparting rotary movement to one or more of the idler pulleys —10—, —10'—, —15—, —21—, —22—, —23— in which case the pulleys so receiving rotary movement would become a driving pulley and would cause the belt to move.

When the belt is in motion it will impart rotary movement to the rollers 7—7, rotary movement being imparted to the undersurfaces of rollers 7—7. The direction of rotation of the rollers 7—7 will be in a direction opposite to the direction in which the belt is moving. Since rollers 7—7 are rotating any merchandise or any merchandise box, as —24—, in contact with the upper surfaces of rollers 7—7 will be caused to move in the direction of rotation of the rollers 7—7. When, however, a box, as —24—, moves on to the upper surfaces of the rollers 7—7 which are positioned between idler rolls 25—25 it will cease its movement inasmuch as such rollers 7—7 are not in contact with belt —9— and are normally in a state of rest and cannot impart any movement to box —24— as shown in my drawing. The two rollers 7—7 which are next beyond idler rolls —25— are also put in a state of rest inasmuch as the position of idler rolls 25—25 in relation to the next adjacent belt supporting rollers 8—8 is such that the belt —9— will not be in contact with the last two-named rollers 7—7.

When it is desired to use the bottom section —2— as a conveyor the box —26— or other merchandise is placed directly on the upper surface of belt —9— and is carried forward thereby to and upon gravity section —16— along which it passes to such position as may have been determined by the shape and length of gravity section —16—.

It will be understood that the length of my conveying system may be varied at will and that the location and number of rollers 7—7 which do not receive rotary motion from belt —9— may be varied at will.

It will also be understood that other and different means may be provided for removing the merchandise from the bottom section —2—, and it will also be understood that any desired means may be provided to remove the merchandise from the upper section —1—. The size of rollers —7—, their relative position one to the other, the type of bearings in which they rotate, and the length and number of my conveyors may, of course, be changed to meet the varying conditions under which the conveying system is to function, and I do not desire to restrict myself to the exact size, shape and relation of parts as various changes may be made within the scope of the appended claims.

What I claim:

1. In a device of the class described, a plurality of conveyor supports in vertically spaced relation, rollers positioned transversely of the supports in longitudinally spaced relation, a moving belt supported on the upper surfaces of the rollers carried by certain of the supports and being supported in frictional contact with the under surfaces of the rollers carried by the other supports, and means for imparting movement to the belt.

2. In a device of the class described, a plurality of conveyor supports in vertically spaced relation, rollers positioned transversely of the supports in longitudinally spaced relation, a moving endless belt supported on the upper surfaces of the rollers carried by certain of the supports and being supported in frictional contact with the under surfaces of the rollers carried by the other supports, and means for imparting movement to the belt.

3. In a device of the class described, conveyor supports having rollers positioned transversely thereof in longitudinally spaced relation, a moving belt supported on the upper surfaces of said rollers, second conveyor supports having rollers positioned transversely thereof in longitudinally spaced relation and having a portion of said belt supported in frictional contact with the under surfaces of said last-named rollers and means for transmitting movement to the belt whereby merchandise placed upon the belt on the first named conveyor supports will be transported in a given direction and merchandise placed upon the rollers of the second conveyor supports will be transported in the same direction.

4. In a device of the class described, in combination a longitudinally extending conveyor support having longitudinally spaced rollers positioned transversely thereof, a moving belt supported on said rollers, a second longitudinally extending conveyor support having longitudinally spaced rollers positioned transversely thereof, means on the first-named conveyor support whereby the moving belt will be guided to the under surfaces of the rollers on the second conveyor support, means on the second conveyor support for holding the belt in frictional contact with said rollers for transmitting movement thereto, means on the second conveyor support for guiding the belt to the upper surfaces of the rollers on the first named conveyor support and means for transmitting movement to the belt whereby merchandise placed on the said conveyors will be transported in approximately the same direction.

5. In a device of the class described, a plurality of conveyor supports in vertically spaced relation, rollers positioned transversely of the supports in longitudinally spaced relation, a moving belt supported on the upper surfaces of the rollers carried by certain of these supports and supported in frictional contact with the under surfaces of the rollers carried by the other supports, a plurality of belt retracting rollers rotatively mounted in the last named supports and positioned to hold the belt from frictional contact with a selected number of the rollers carried by such supports, and means for imparting movement to the belt.

In witness whereof I have hereunto set my hand this 23rd day of January, 1928.

WILLIAM J. TAYLOR.